No. 777,298. PATENTED DEC. 13, 1904.
W. MAYER.
AMMUNITION WAGON OR LIMBER.
APPLICATION FILED APR. 18, 1904.
NO MODEL. 6 SHEETS—SHEET 1.

Witnesses.
O. Knight, Jr.
Jno. R. Adams

Inventor
Wilhelm Mayer
by Knight Bros
Attys.

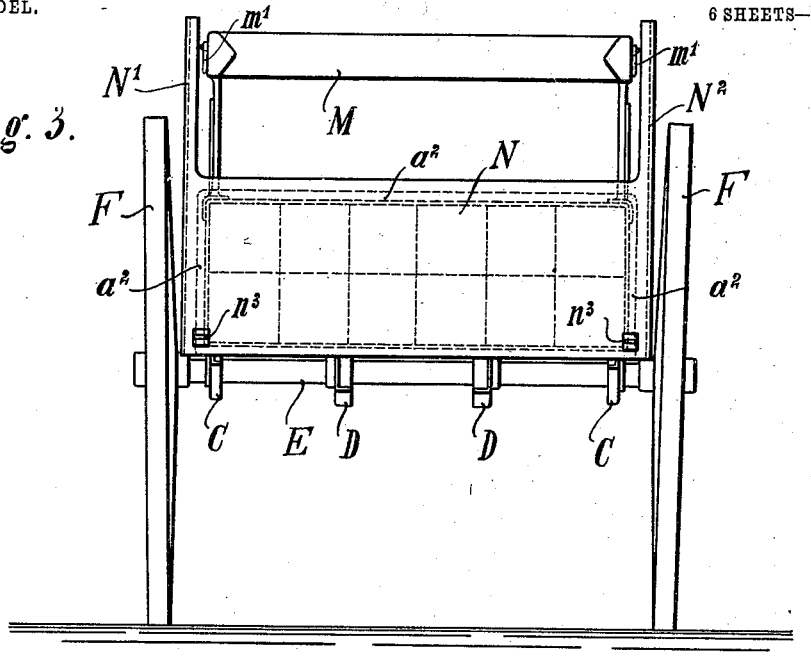
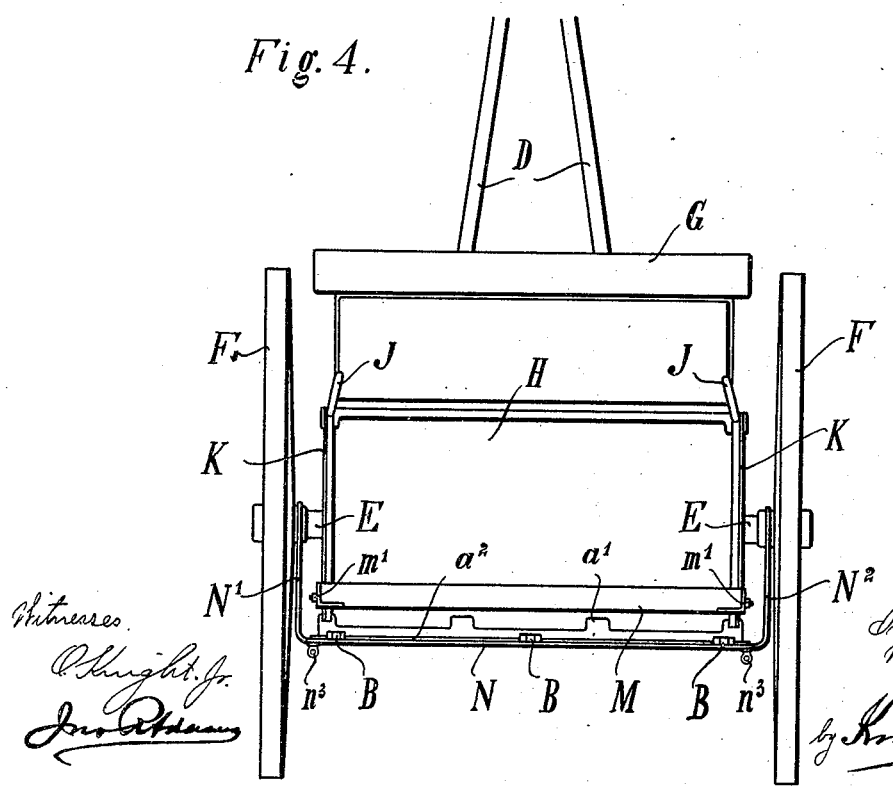

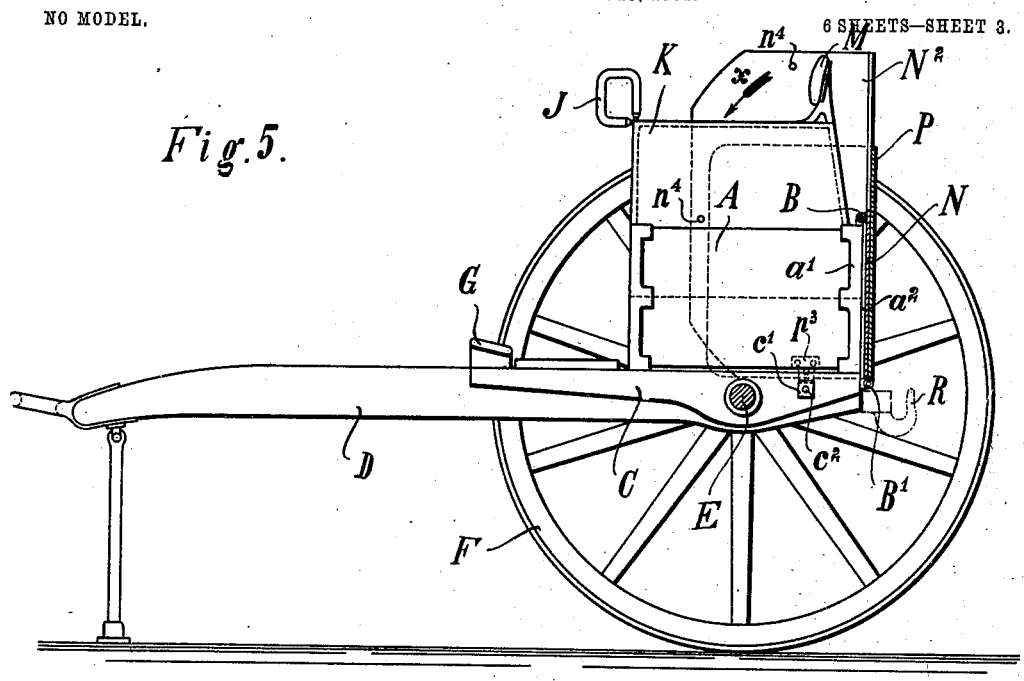
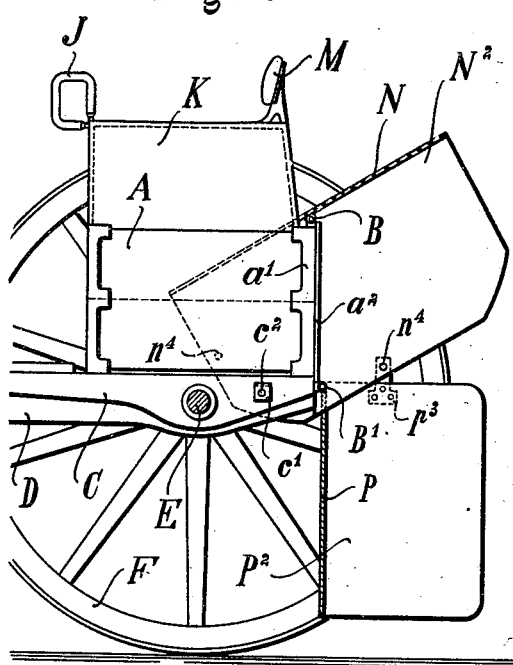
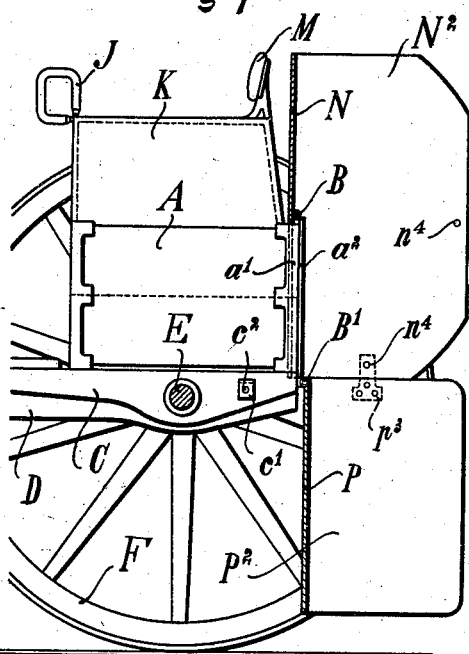

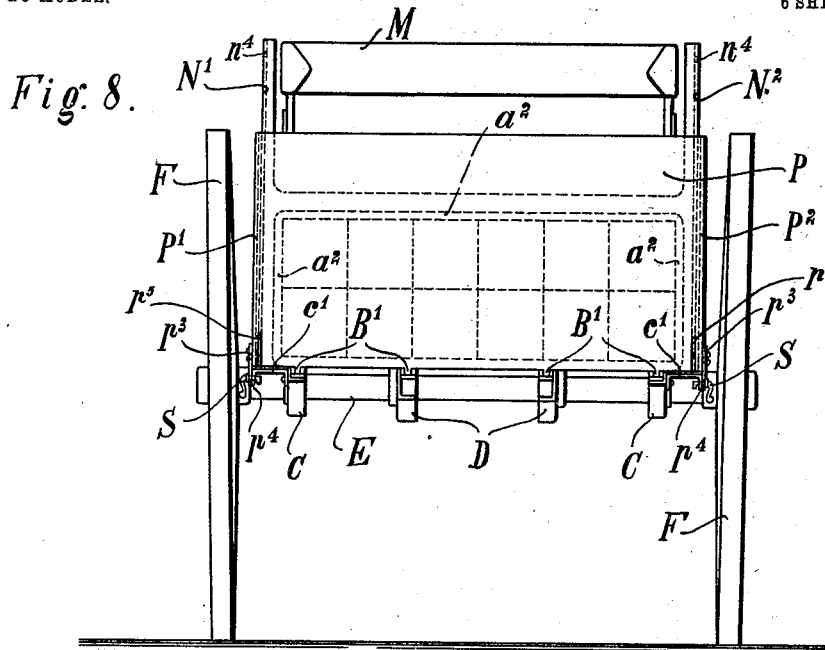
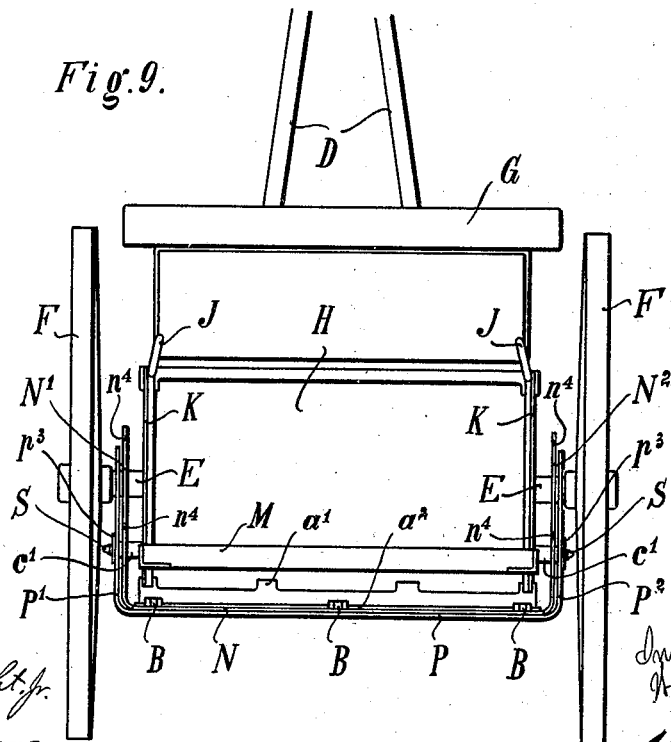

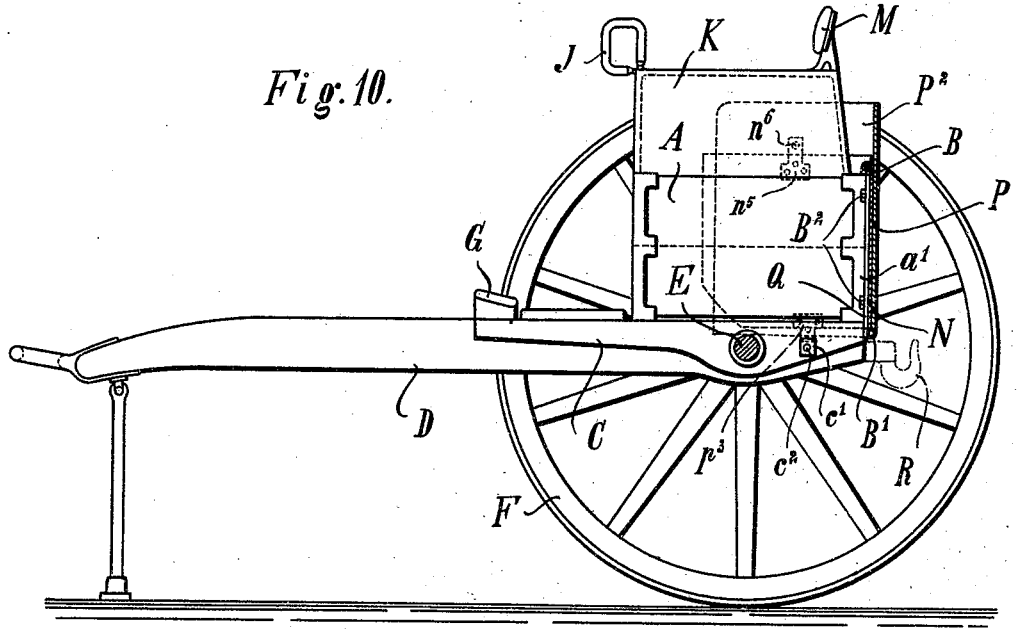
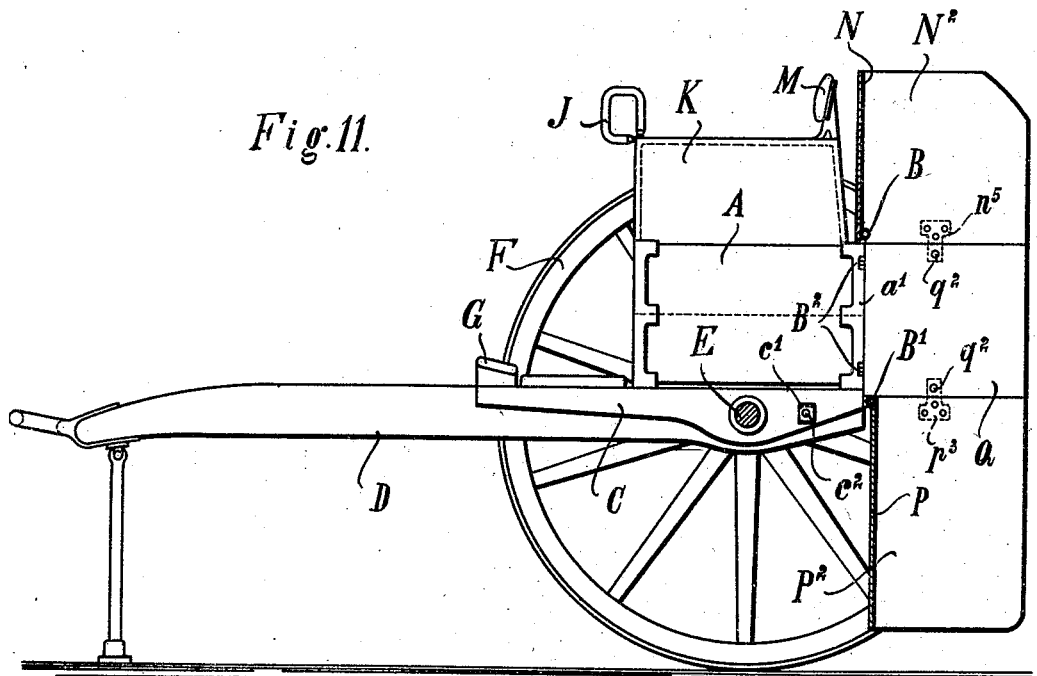

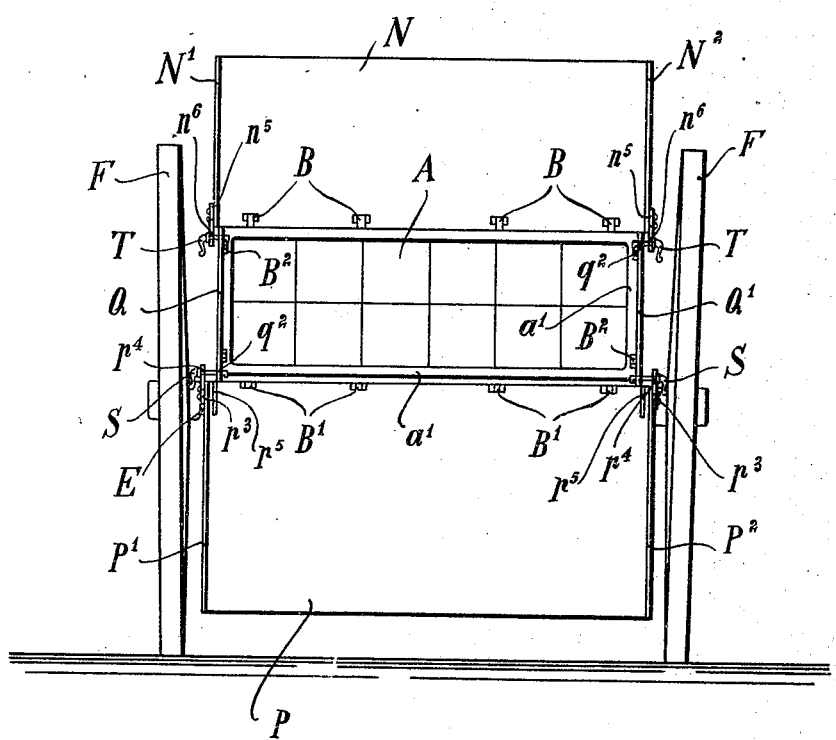

No. 777,298. Patented December 13, 1904.

UNITED STATES PATENT OFFICE.

WILHELM MAYER, OF RÜTTENSCHEID, NEAR ESSEN-ON-THE-RUHR, GERMANY, ASSIGNOR TO FRIED. KRUPP, AKTIENGESELLSCHAFT, OF ESSEN-ON-THE-RUHR, GERMANY.

AMMUNITION-WAGON OR LIMBER.

SPECIFICATION forming part of Letters Patent No. 777,298, dated December 13, 1904.

Application filed April 18, 1904. Serial No. 203,661. (No model.)

*To all whom it may concern:*

Be it known that I, WILHELM MAYER, a subject of the Emperor of Germany, and a resident of Rüttenscheid, near Essen-on-the-Ruhr, Germany, have invented certain new and useful Improvements in Ammunition-Wagons or Limbers, of which the following is a specification.

The present invention relates to ammunition-wagons or limbers, and has for its object to arrange the door of the ammunition-box in such a manner that it can serve as a protecting-shield for the serving crew against frontal and lateral fire. I attain this object by providing the ammunition-box, whether on an ammunition-wagon or on a limber, with at least one door of sheet-steel and of a channel-iron section, which door is hinged to the box in such a manner that the middle or cross plate of the door may cover the box-opening and the side plates serve as lateral protecting-shields when the door is open.

In the annexed drawings are shown three modes of constructing an ammunition-vehicle provided with such a door.

Figure 1:
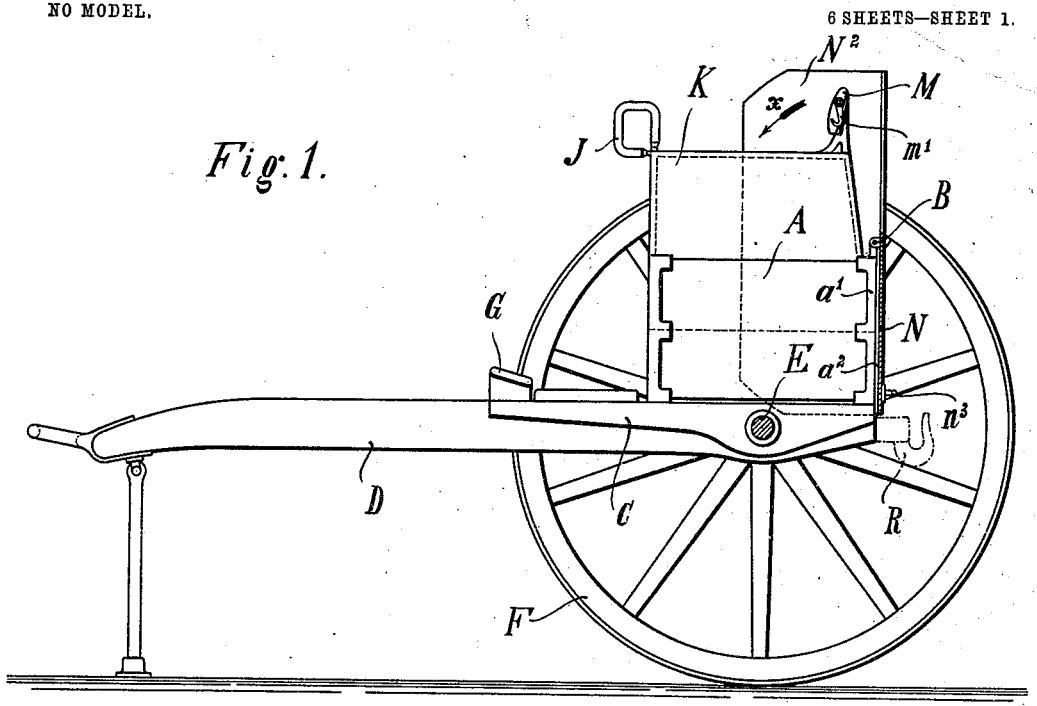
Figure 2:
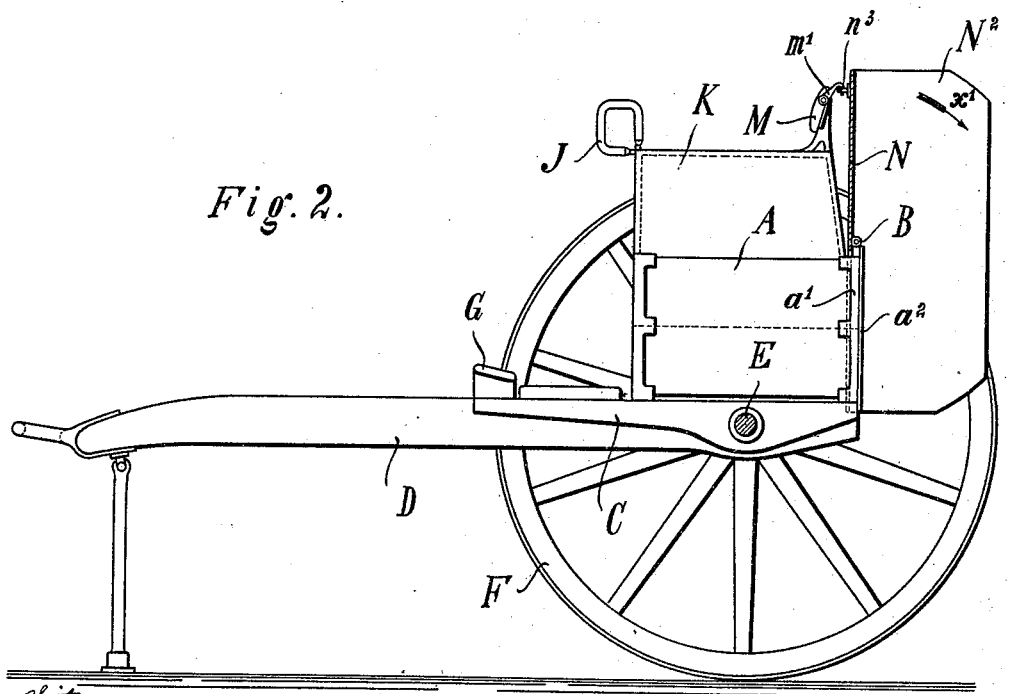

Figures 1, 5, and 10 show a side view, partly in section, of each of the three modes of construction, the door being closed in each view. Fig. 2 is a view similar to Fig. 1 with the door open. Figs. 3 and 4 are respectively a rear view and a top view of Fig. 1. Figs. 6 and 7 are views similar to Fig. 5, showing the door open. Figs. 8 and 9 are respectively a rear view and a top view of Fig. 5. Fig. 11 is a view similar to Fig. 10, with the door open; and Fig. 12, a rear view of the same.

The ammunition-wagon consists of the box A, in which the ammunition is stored and which is closed by a door; the frame formed by the box-sills C and the beams D, the axle E, the wheels F, the foot-rest G, and the seat, which is formed by the cover H, Figs. 4 and 9, of the box, the side boards K, and the back M. The boards K are secured at the sides of the box-cover and each of them is provided with a handle J.

In describing the construction and arrangement of the wagon-box door reference will first be made to the position shown in Figs. 1, 5, and 10. In all the modes of construction the door of the wagon-box is made, preferably, of sheet-steel in order that it can serve as a protecting-shield for the serving crew against the fire of the enemy.

In Figs. 1 to 4 the wagon-box door consists of one leaf $N N' N^2$ of a channel-section, which by means of hinges B is secured to the rear frame $a'$ of the wagon-box in such a manner that the door can be swung in the direction of the arrow $x$, Fig. 1, from the position shown in Figs. 1, 3, and 4 to the position indicated in Fig. 2. The cross-plate N of the door, which closes the box and bears against the outer flange $a^2$ of the frame $a'$, is provided close above the hinges B with a rectangular recess for the purpose of permitting the swinging of the door. The sides $N' N^2$ of the door, which by reason of the recess in the cross-plate are of a greater height than the solid part of said plate, project forwardly when the door is closed into the space between the wheels F and the wagon-box A, while when the door is open, Fig. 2, these sides project rearwardly and afford lateral protection to the space behind the ammunition-wagon, which is to be occupied by the serving crew when in action. In the last-named position the solid part of the cross-plate N is above the wagon-box, so as to protect the serving crew against fire from the front. The door can when in the closed position be secured to the wagon-box in any suitable manner. In order to fix the door in the open position, the base-plate may, for instance, be provided with two loops $n^3$, and hooks $m'$ may be arranged on the back M in positions to be received in said loops. The swinging or folding of the door from the open to the closed position is effected in the direction of the arrow $x'$, Fig. 2.

The mode of construction shown in Figs. 5 to 9 differs from that just described in that besides the door $N N' N^2$ a second door, $P P' P^2$, of channel section, is provided. In this second door, however, the sides $P' P^2$ are of the same height as the cross-plate P. The door P P′ P² is secured close beneath the frame $a'$ of the wagon-box A to the box-sills C and beams D by means of hinges B′ in such a manner that it can be swung down from the position shown in Figs. 5, 8, and 9 to that shown in Figs. 6 and 7. The sides P′ P² of the last-named door are greater distance apart than the sides of the door N N′ N², and when the doors are closed they project forwardly into the space between the wheels F and the sides of the door N N′ N². When the doors are open, Figs. 6 and 7, the sides P′ P² are directed rearwardly, so as to protect the serving crew against lateral fire. When the doors are closed, the cross-plate P of the door P P′ P² covers the cross-plate N of the door N N′ N², and when the doors are open the cross-plate P protects the serving crew against frontal fire. The opening of the doors is effected by first swinging the door P P′ P² down and then swinging the door N N′ N² in the direction of the arrow $x$, Fig. 5, to the position shown in Figs. 6 or 7, in which position it protects the serving crew against fire from the front and the sides. The shutting of the doors is effected in reverse order and direction. In order to secure the doors in the positions shown in the drawings, the following means has been provided. On the outer face of each of the side plates of the door P P′ P² is fixed a lapping plate $p^3$, provided with a hole $p^4$, Fig. 8. On the outer face of each of the sills C and in the path of movement of these lapping plates $p^3$ is rigidly secured a sheet-metal bracket $c'$, bent at right angles and provided in its outwardly-presented end with a hole $c^2$, Figs. 5 to 7, while in each of the sides of the door N N′ N² two holes $n^4$ are formed. The holes $c^2$ and $n^4$ are arranged in such a manner that they can be brought to register with the hole $p^4$ of the lapping plate $p^3$, and the doors can consequently be secured in the closed and also in the open position by means of two locking-bolts S, Figs. 8 and 9, which are introduced into the holes $p^4$ and $c^2$ or $n^4$.

Instead of the double door above described the box-opening may, while retaining all the other details, be closed by a simple two-fly door, and in such case the height of the cross-plates N and P is such that each cross-plate covers half the part of the box-opening.

The mode of construction shown in Figs. 10 to 12 differs from those above described that beside the doors N N′ N² and P P′ P² of channel section two plate-like door-flies Q Q′ are provided for, while the sides of the door N N′ N² are of the same height as the cross-plate of said door. The door-flies Q Q′ are secured to the vertical box-frames $a'$ by means of hinges B² in such a manner that they can be swung from the position shown in Fig. 10 to the position shown in Figs. 11 and 12, in which they protect the serving crew against lateral fire. When the doors are closed, the plates rest against the frame $a'$, in which position they are covered by the cross-plate N of the door N N′ N², which plate in its turn is covered by the cross-plate P of the door P P′ P². The opening of the doors is effected by first swinging the door P P′ P² downwardly, thereupon swinging the door N N′ N² upward, and finally swinging the plates Q Q′ so far outward that they lie parallel to the sides of the doors N N′ N² and P P′ P².

The shutting of the doors is effected in the reverse order and direction. The doors may be kept in the closed position by the same means as are used for this purpose in the second mode of construction. In order to rigidly connect the open doors by means of locking-bolts S and T, Fig. 12, each of the sides of the door N N′ N² is provided with a lapping plate $n^5$, Figs. 10 and 12, having a hole $n^6$. Furthermore, two holes $q^2$ are made in each of the plates Q Q′, which holes are arranged in such a manner that they can be brought to register with the hole $p^4$ of the lapping plates $p^3$ or the hole $n^6$ of the lapping plates $n^5$. The arrangement of the doors shown permits also of the door N N′ N² being brought into such position that its cross-plate N rests on the upper edges of the opened plates Q Q′, thus protecting the serving crew against steep-falling fragments, &c.

The several forms of invention are equally applicable to limbers, which, generally speaking, differ from the ammunition-wagons above described only in the substitution of the pole for the beams D of the frame and the use of a limber-hook R, Figs. 1, 5, and 10. In the mode of construction shown in Figs. 5 to 12 the cross-plate P of the door P P′ P² must in such case of using the limber-hook be provided with an opening for such hook.

Having thus described the invention, the following is what is claimed as new therein:

1. An ammunition-vehicle having a door of channel section secured to the box thereof and movable at will into a position to close the box-opening or into a position to bring the sides of said door to the sides of the space occupied by the serving crew to protect the latter against lateral fire.

2. In combination with the box of an ammunition-vehicle, a door of channel section hinged to said box in position to close the opening of the box by the cross-plate of said door with the sides of the door projecting along the sides of the box, and adapted to swing into a position to present the sides of the door rearwardly and afford protection against lateral fire.

3. In combination with the box of an ammunition-vehicle, a door of channel section hinged to said box in position to close the opening of the box by the cross-plate of said door, with the sides of the door projecting along the sides of the box, and adapted to swing into a position to present the sides of the door rearwardly and afford protection against lateral fire; said sides being of greater height than the cross-plate whereby they are adapted to afford lateral protection in the line of the box-opening uncovered by the cross-plate of said door.

4. An ammunition-vehicle, having a box with an opening, and overlapping doors of channel sections folding over the opening of the box to close the same; said doors being hinged to said box to swing away from the opening thereof and having their sides projecting rearward when the box is open to provide protection against lateral fire.

5. An ammunition-vehicle having a box with an opening, and overlapping doors of channel section folding over the opening of the box to close the same; said doors being hinged to said box to swing away from the opening thereof and having their sides projecting rearward when the box is open to provide protection against lateral fire, the sides of one of the doors being extended beyond the cross-plate thereof to correspond to the vertical dimension of the opening.

The foregoing specification signed at Düsseldorf this 18th day of March, 1904.

WILHELM MAYER.

In presence of—
   WILLIAM ESSENWEIN,
   PETER LIEBER.